United States Patent
Hevesi

(10) Patent No.: US 9,482,799 B2
(45) Date of Patent: Nov. 1, 2016

(54) SOLAR-CONTROL GLAZING UNIT

(71) Applicant: AGC GLASS EUROPE, Louvain-la-Neuve (BE)

(72) Inventor: Kadosa Hevesi, Gosselies (BE)

(73) Assignee: AGC Glass Europe, Louvain-la-Neuve (BE)

( * ) Notice: Subject to any disclaimer, the term of this patent is extended or adjusted under 35 U.S.C. 154(b) by 0 days.

(21) Appl. No.: 14/356,531

(22) PCT Filed: Nov. 23, 2012

(86) PCT No.: PCT/EP2012/073447
§ 371 (c)(1),
(2) Date: May 28, 2014

(87) PCT Pub. No.: WO2013/079400
PCT Pub. Date: Jun. 6, 2013

(65) Prior Publication Data
US 2014/0347722 A1  Nov. 27, 2014

(30) Foreign Application Priority Data

Nov. 29, 2011 (BE) .................. 2011/0696

(51) Int. Cl.
G02B 5/28 (2006.01)
C03C 17/36 (2006.01)
G02B 1/11 (2015.01)

(52) U.S. Cl.
CPC .............. *G02B 5/282* (2013.01); *C03C 17/36* (2013.01); *C03C 17/366* (2013.01); *C03C 17/3613* (2013.01); *C03C 17/3639* (2013.01); *C03C 17/3644* (2013.01); *C03C 17/3652* (2013.01); *C03C 17/3681* (2013.01); *G02B 1/11* (2013.01)

(58) Field of Classification Search
CPC .............. C03C 17/36; C03C 17/3639; C03C 17/3644; C03C 17/366; C03C 17/3681; G02B 5/282
See application file for complete search history.

(56) References Cited

U.S. PATENT DOCUMENTS

| 5,071,206 A | 12/1991 | Hood et al. |
| 5,595,825 A * | 1/1997 | Guiselin ............... 428/428 |
| 6,055,088 A * | 4/2000 | Fix et al. ............... 359/265 |
| 6,340,529 B1 * | 1/2002 | Ebisawa et al. ........ 428/432 |
| 2007/0081227 A1* | 4/2007 | Hartig ..................... 359/359 |
| 2007/0082168 A1 | 4/2007 | Hartig |
| 2007/0082206 A1 | 4/2007 | Hartig |
| 2011/0146172 A1* | 6/2011 | Mauvernay et al. ...... 52/235 |
| 2012/0177900 A1 | 7/2012 | Laurent et al. |
| 2013/0057951 A1 | 3/2013 | Hevesi et al. |
| 2013/0059137 A1 | 3/2013 | Hevesi et al. |

FOREIGN PATENT DOCUMENTS

| EP | 0 645 352 | 3/1995 |
| WO | 2011 020974 | 2/2011 |
| WO | 2011 147875 | 12/2011 |

OTHER PUBLICATIONS

International Search Report Issued Mar. 1, 2013 in PCT/EP12/073447 Filed Nov. 23, 2012.

* cited by examiner

*Primary Examiner* — Thomas K Pham
*Assistant Examiner* — Mitchell Oestreich
(74) *Attorney, Agent, or Firm* — Oblon, McClelland, Maier & Neustadt, L.L.P.

(57) ABSTRACT

The present invention relates to a substrate bearing a solar-control multilayer stack, and to a multiple glazing unit and to a laminated glazing unit incorporating at least one such substrate bearing a solar-control stack.

The multilayer stack comprises three functional films, each film, starting from the substrate, being thicker than the preceding one, and four transparent dielectric coatings. The ratio of the optical thickness of the third dielectric coating, to the optical thickness of the final dielectric coating, lies between 2 and 3.2, and the ratio of the optical thickness of the third dielectric coating, to the optical thickness of the second dielectric coating, is either between 0.6 and 0.91 or between 1.15 and 1.7.

The invention is applicable, in particular, to production of high-selectivity solar-control glazing units.

40 Claims, No Drawings

SOLAR-CONTROL GLAZING UNIT

TECHNICAL FIELD

The present invention relates to a transparent substrate bearing a solar-control multilayer stack and also to a multiple glazing unit incorporating at least one such transparent substrate bearing a solar-control multilayer stack.

Solar-control stacks, which are also called antisolar stacks, to which the present invention relates, comprise functional films, such as silver-based films, that reflect infrared radiation, associated with antireflection dielectric coatings that act to reduce reflected light and to control other properties of the multilayer such as its colour, but which also act as tie films and protect the functional films. Solar-control stacks commonly contain two functional films sandwiched between dielectric films. More recently, stacks comprising three functional films have been proposed in order to improve further the solar protection provided while retaining the highest possible light transmission. Each functional film is separated by at least one dielectric coating, such that each functional film is sandwiched between two dielectric coatings. The various films of the stack are, for example, deposited by magnetron sputtering. The present invention is not however limited to this particular film deposition process.

Solar-control stacks are used to produce solar-protection glazing units, or antisolar glazing units, in order to reduce the risk of excessive heating by sunshine, for example of a closed space with large glazed areas, and thus reduce the air-conditioning load in summertime. The transparent substrate then often consists of a glass sheet, but it may also, for example, be formed from a sheet of a plastic such as PET (polyethylene terephthalate), which is then either enclosed between two sheets of glass by means of a film of an adhesive polymer such as a PVB (polyvinyl butyral) or EVA (ethylene/vinyl acetate) in order to form a laminated glazing unit, or enclosed inside a multiple glazing unit.

Thus, the glazing unit must limit the amount of solar energy transmitted, i.e. it must have a relatively low solar factor (SF or g). It must however guarantee the highest possible light transmission ($T_L$) so as to ensure the inside of the building is satisfactorily illuminated. These requirements, which are somewhat contradictory, stipulate a glazing unit with a high selectivity (S), selectivity being defined as the ratio of the light transmission to the solar factor. These solar-control stacks also have a low emissivity, which allows heat loss by long-wavelength infrared radiation to be reduced. They thus increase the thermal insulation of large glazed areas and reduce energy loss and heating costs during cold periods.

Light transmission ($T_L$) is the percentage of the incident light flux, under illuminant D65, transmitted by the glazing in the visible range. The solar factor (SF or g) is the percentage of the incident radiant energy that is, on the one hand, directly transmitted by the glazing unit, and on the other hand, absorbed by the latter and then reemitted, relative to the glazing unit, in the opposite direction to the energy source.

These antisolar glazing units are in general multiple glazing units such as double or triple glazing units in which the glass sheet bearing the stack is associated with one or more other glass sheets that are also optionally coated, the solar-control multilayer stack making contact with the internal cavity between the glass sheets.

In certain cases, it is necessary to carry out an operation in order to mechanically strengthen the glazing unit, for instance thermal tempering of the one or more glass sheets, so as to increase the ability of the unit to withstand mechanical stresses. Optionally, it is also possible, for particular applications, to give the glass sheets a relatively complex curvature by way of a high-temperature bending operation. In the processes used to manufacture and shape glazing units, there are certain advantages to carrying out these heat-treatment operations after the substrate has been coated, instead of coating a previously treated substrate. These operations are carried out at a relatively high temperature, at which temperature the functional film, based on a material that reflects infrared, for example silver, tends to deteriorate and lose its optical properties and its properties with respect to infrared radiation. These heat treatments especially consist in heating the glass sheet to a temperature above 560° C., for example to a temperature between 560° C. and 700° C., and especially to between 640° C. and 670° C., in air, for about 6, 8, 10, 12 or even 15 minutes, depending on the type of treatment and the thickness of the sheet. In the case of a bending treatment, the glass sheet may then be bent to the desired shape. In contrast, the tempering treatment then consists in suddenly cooling the flat or curved surface of the glass sheet, using jets of air or a coolant, in order to mechanically strengthen the sheet.

In the case where it is necessary for the coated glass sheet to undergo a heat treatment, it is necessary to take very particular precautions when producing the stack structure, because it must be able to withstand a tempering and/or bending heat treatment, this property sometimes being referred to below by the term "temperable", without losing its optical and/or energy properties, which are the reason it exists in the first place. In particular, it is necessary to use dielectric materials, in the form of dielectric coatings, which can withstand the high temperatures of the heat treatment without undergoing any undesirable structural changes. Examples of materials that are particularly suited to this role are mixed zinc tin oxide, and especially zinc stannate, silicon nitride and aluminium nitride. It is also necessary to take care that the functional films, which are for example silver-based, are not oxidized during the treatment, for example by ensuring that, when the stack is treated, sacrificial layers are in place, these layers oxidizing instead of the silver and thus gettering free oxygen.

It is also desirable for the glazing units to meet certain aesthetical criteria in terms of light reflection ($R_L$)—i.e. the percentage of the incident light flux, under illuminant D65, reflected by the glazing unit in the visible range—and colour in reflection and transmission. Market demand is for glazing units that have a relatively low light reflection, but not too low in order to avoid the "black hole" effect when a building is viewed under certain dim lighting conditions. Furthermore, combining a high selectivity and a relatively low light reflection sometimes leads to purple tints in reflection, which are not very aesthetically pleasing.

Antisolar glazing units are also used in the automotive glazing field, for example as windscreens, but also in the other glazing units of a vehicle, such as side windows, rear windscreens, or in the roof of the vehicle. In this field, glazing units are often laminated, i.e. the substrate bearing the stack is associated with another transparent substrate, optionally also bearing a stack, by way of an adhesive plastic film generally made of PVB, the antisolar stack being placed inside the laminated unit in contact with the PVB. Vehicle windows must generally be curved to match the shape of the vehicle. When the substrate is a glass sheet, the bending operation is carried out at a high temperature and the substrate equipped with its stack is then subjected to a heat treatment similar to the tempering treatment described above, whether it is rapidly cooled or not, and is in addition subjected to a shaping operation while the substrate is still at a high temperature.

To reduce the amount of heat that penetrates, through the glazing unit, into the premises or vehicle, the amount of invisible heat-producing infrared radiation passing through the glazing unit is reduced by reflecting this radiation. This is the role of the functional films based on a material that reflects infrared radiation. They are an essential element of the solar-control stack.

PRIOR ART

A number of solutions have been proposed to improve solar protection while preserving maximal light transmission, but no solution has provided a completely satisfactory glazing unit that combines optimal optical and thermal properties with stability during manufacture.

Patent application WO 2009/029466 A1, in the name of PPG Industries, describes a laminated glazing unit, for an automotive vehicle, in which a glass sheet bears a stack comprising three functional silver-based films. Starting from the glass sheet bearing them, each silver film is thinner than the preceding one. This document describes a stack with a high light transmission, which can be used to form the windscreen of an automotive vehicle. However, the selectivity of this stack is relatively low.

Patent application EP 645 352 A1, filed by Saint-Gobtain Glass, describes an antisolar glazing unit the stack of which comprises three silver films of increasing thickness, starting from the glass. However, according to Examples 1 and 2 of this document, either the selectivity is relatively low, or the colour in reflection is relatively unstable and highly sensitive to fluctuations in thickness during manufacture, or to the lack of transverse uniformity. Specifically, to obtain an industrially acceptable stack, not only must the thicknesses of the functional films be fixed, but the thicknesses of the dielectric coatings must also be adjusted. There are a great many ways to do this and document EP 645 352 A1 does not teach how to obtain the best possible results.

Patent application WO 2010/037698 A1, filed by Saint-Gobain Glass, attempts to solve the problem of stability during manufacture. For this purpose it describes an antisolar glazing unit having a stack comprising at least three silver films the geometric thicknesses of which have central symmetry. This arrangement is intended to improve manufacturing stability uniquely with regard to parallel movements of the dielectric coatings (in this case, the thicknesses of all the dielectric coatings increase or decrease together by the same amount). However, thickness variations may have a cumulative or decumulative effect on any fluctuation in tint. In industrial practice, the deposition processes used to deposit the various dielectric coatings are independent of one another, it is therefore necessary to ensure a good tint stability individually for each thickness variation while also taking account of variations in the thicknesses of the functional films. Furthermore, this stack has a lower selectivity. Thus, the nub of the problem is how to keep a good stability while maximizing selectivity. In addition, the examples relate to stacks comprising four functional films.

SUMMARY OF THE INVENTION

One of the objectives of the invention is to provide a transparent substrate bearing a solar-control multilayer stack that provides effective solar protection with a high selectivity while completely overcoming the drawbacks of the prior art.

Another objective of the invention is to provide a coated substrate which has a pleasing appearance, both in transmission and in substrate-side reflection, and meets commercial requirements, for example especially having a relatively neutral tint.

Another objective of the invention is to make it easier to obtain a coated substrate that has a tint with a good angular stability in reflection, i.e. the amplitude of the tint variation is small or acceptable, without substantially modifying the hue of the tint.

Another objective of the invention is to provide a coated substrate the tint in reflection of which, observed on the substrate side, does not vary much when film thicknesses fluctuate during manufacture of a batch of coated substrates, or when there is a lack of transverse uniformity caused by a variable deposition rate along the cathodes.

Another objective of the invention is to provide a coated substrate that can be easily mass produced on an industrial scale at an advantageous cost price.

The invention relates to a transparent substrate bearing a solar-control multilayer stack comprising three functional films based on a material that reflects infrared radiation and four dielectric coatings, such that each functional film is sandwiched between dielectric coatings, characterized in that, the geometric thickness of the second, counting from the substrate, functional film is larger than the geometric thickness of the first functional film and the geometric thickness of the third functional films is larger than the geometric thickness of the first functional film, and in that the ratio of the optical thickness of the transparent dielectric coating placed between the second and third, counting from the substrate, functional films, to the optical thickness of the final transparent dielectric coating placed on the last functional film, is between 2.0 and 3.2, and in that the ratio of the optical thickness of the transparent dielectric coating placed between the second and third functional films, to the optical thickness of the transparent dielectric coating placed between the first and second functional films, is either between 0.6 and 0.9 or between 1.15 and 1.7.

Surprisingly, respecting the combination of features claimed in claim 1 makes it easier to achieve coated substrates having optical properties that remain very stable during industrial mass production. Interference effects are complex, and the fact that stacks according to the invention contain many films increases the complexity. Fluctuations in film thicknesses during production may lead to the optical properties of the coated substrate being substantially modified. The invention allows this adverse modification of the quality of these industrially mass produced products to be more easily minimized.

In the present description, when the range of given values is contained between two limits, the limits are implicitly included in the given range. Optical thickness is defined as the geometric (physical) thickness of the considered film multiplied by its refractive index. The variation in the refractive index of the various materials as a function of wavelength may differ substantially. In the context of the present invention, the optical thickness of the transparent dielectrics is calculated using the following formula:

$$\text{optical thickness} = d \text{ multiplied by } n_v$$

where d is the geometric (physical) thickness of the considered film and $n_v$ is a virtual refractive index obtained using the following formula:

$$n_v = (0.6902 \times n(550)^2) - (0.165 \times n(550)) - 0.4643$$

where n(550) is the refractive index of the material at a wavelength of 550 nm.

If a transparent dielectric coating consists of a plurality of films, the total optical thickness of the transparent dielectric coating to be considered is the sum of the optical thicknesses of the various films, calculated as indicated above.

In the present description, unless otherwise indicated, for the sake of simplicity a refractive index of 2.03 has always been used, which refractive index corresponds to dielectric materials such as ZnO, $SnO_2$ or zinc stannate $ZnSnO_4$. However, it will of course be understood that other dielectric materials may be used. By way of example, here are the refractive indices n(550), at a wavelength of 550 nm, of a few of the most commonly used dielectric materials: $TiO_2$, n(550)=2.5; $Si_3N_4$, n(550)=2.04; $Al_2O_3$, n(550)=1.8; AlN, n(550)=1.9.

In the present description, unless otherwise indicated, all the optical and thermal property values and ranges of values are given for a double glazing unit formed by: an ordinary 6 mm-thick soda-lime glass pane bearing the film stack; a 15 mm-thick intermediate cavity filled with 90% Ar and 10% air; and another 4 mm-thick uncoated soda-lime glass pane. The coated face of the 6 mm-thick glass pane is located inside the double glazing unit. The reflection observed on the same side as the 6 mm-thick glass pane is denoted "$R_G$", i.e. reflection from the "glass side" of the coated glass, whereas the reflection observed on the same side as the 4 mm-thick glass pane is denoted "$R_F$", i.e. reflection from the "film side" of the coated glass. Tints are expressed as CIELAB L*a*b* coordinates under illuminant D65, for a 10° observer. The light transmission ($T_L$) of the stack-less ordinary soda-lime glass is 89% for the 6 mm-thick pane and 90% for the 4 mm-thick pane.

Transparent dielectric coatings are well known in the field of sputter-deposited films. There are many suitable materials and it is pointless to list all of them here. They are in general oxides, oxynitrides or metal nitrides. Among the most common, mention may be made, by way of example, of $SiO_2$, $TiO_2$, $SnO_2$, ZnO, $ZnAlO_x$, $Si_3N_4$, AlN, $Al_2O_3$, $ZrO_2$, $Nb_2O_5$, $YO_x$, $TiZrYO_x$, $TiNbO_x$, $HfO_x$, $MgO_x$, $TaO_x$, $CrO_x$ and $Bi_2O_3$ and mixtures thereof. Mention may also be made of the following materials: AZO, ZTO, GZO, $NiCrO_x$, TXO, ZSO, TZO, TNO, TZSO, TZAO and TZAYO. The term "AZO" refers to aluminium-doped zinc oxide or mixed aluminium-zinc oxide, preferably obtained using a ceramic cathode made of the oxide to be deposited, either in an inert or slightly oxidizing atmosphere. Similarly, the terms "ZTO" or "GZO" refer to mixed zinc-titanium oxide and mixed gallium-zinc oxide, respectively, obtained using ceramic cathodes either in an inert or slightly oxidizing atmosphere. The term "TXO" refers to titanium oxide obtained using a ceramic cathode made of titanium oxide. The term "ZSO" refers to mixed zinc-tin oxide obtained either from a metallic cathode made of the alloy, deposited under an oxidizing atmosphere, or from a ceramic cathode made of the corresponding oxide, deposited either in an inert or slightly oxidizing atmosphere. The terms TZO, TNO, TZSO, TZAO or TZAYO refer to mixed titanium-zirconium oxide, mixed titanium-niobium oxide, mixed titanium-zirconium-tin oxide, mixed titanium-zirconium-aluminium oxide, and mixed titanium-zirconium-aluminium-yttrium oxide, respectively, obtained using ceramic cathodes, either in an inert or slightly oxidizing atmosphere. All the materials cited above may be used to form the transparent dielectric coatings employed in the present invention.

Preferably, the ratio of the optical thickness of the transparent dielectric coating placed between the second and third, counting from the substrate, functional films, to the optical thickness of the final transparent dielectric coating placed on the last functional film, is 2.1 or more, this ratio preferably lying between 2.1 and 3.0, advantageously between 2.1 and 2.7, for example between 2.15 and 2.7, and even more favourably between 2.15 and 2.55.

Preferably, the second, counting from the substrate, functional film is between 12 and 16 nm in thickness, and advantageously between 13 and 15 nm in thickness, and the optical thickness of the first dielectric deposited on the substrate lies between 44 and 86 nm, and advantageously between 46 and 80 nm. These features make it possible to obtain stacks having a tint in reflection, as seen on the substrate side, that is particularly pleasing, with, inter alia, a* values lying between −1.5 and −4 and b* values lying between −3 and −9.

Preferably, each of the three functional films, starting from the substrate, being thicker than the preceding one, that is to say that the thickness of the third functional film, starting from the substrate, is also larger than the thickness of the second functional film. Advantageously, each of the second and third functional films is at least 5% thicker than the preceding one.

Preferably, according to a first embodiment of the invention, the ratio of the optical thickness of the transparent dielectric coating placed between the second and third functional films, to the optical thickness of the transparent dielectric coating placed between the first and second functional films, is 0.9 or less, this ratio preferably lying between 0.65 and 0.9, and advantageously between 0.7 and 0.85.

Stacks obtained according to the first embodiment of the invention are more stable in terms of tint observed in reflection on the stack side. Thus, the stability of the tint during manufacture, expressed by the "Deltacol" value the formula of which is given below, observed on the stack side, is from 1.8 to 2.5, for a selectivity of 1.95 to 2.02. In addition these stacks combine an excellent appearance with good angular stability and also have the advantage that the tint, observed in reflection on the substrate side, is stable during manufacture, this stability, expressed by the Deltacol value, being for example lower than 2.1, even lower than 1.9 and indeed even lower than 1.8.

The stability of the tint in mass-production manufacturing is an important element if production of a consistently high-quality product is to be guaranteed. For the sake of comparison, the variation of the tint in reflection following a fluctuation in film thickness is quantified using a mathematical formula. The tint variation index during manufacture has been called "Deltacol" and is defined by the following relationship:

$$Deltacol = 0,5 \times \left( \sqrt{\frac{\Delta a^*}{1,2}} + \sqrt{\frac{\Delta b^*}{2,4}} \right)$$

in which $\Delta a^*$ and $\Delta b^*$ are the differences between the highest values and the lowest values of a* and b*, respectively, when the thickness of each functional film and each dielectric coating of the stack varies individually plus or minus 2.5%. The values a* and b* are CIELAB (1976) L*a*b* coordinates measured under Illuminant D65/10° observer.

Preferably, according to the first embodiment of the invention, the geometric thickness of the first, counting from the substrate, functional film lies between 9 and 14 nm, preferably between 10 and 13 nm, and advantageously between 11 and 13 nm.

Preferably, according to the first embodiment of the invention, the geometric thickness of the last, counting from the substrate, functional film lies between 11.5 and 17 nm, and preferably between 13 and 16 nm.

Preferably, according to the first embodiment of the invention, the optical thickness of the second transparent dielectric coating, placed between the first and second functional films, lies between 138 and 170 nm, preferably between 140 and 165 nm, and advantageously between 148 and 160 nm.

Preferably, according to the first embodiment of the invention, the optical thickness of the third transparent dielectric coating, placed between the second and third functional films, lies between 101 and 155 nm, preferably between 107 and 147 nm, and advantageously between 117 and 147 nm.

Preferably, according to the first embodiment of the invention, the optical thickness of the final transparent dielectric coating, placed on the last functional film, lies between 40 and 76 nm, preferably between 44 and 71 nm, and advantageously between 50 and 70 nm.

Preferably, according to the first embodiment of the invention, the ratio of the optical thickness of the first transparent dielectric coating, placed between the substrate and the first, counting from the substrate, functional film, to the optical thickness of the final transparent dielectric coating, placed on the last functional film, lies between 0.5 and 1.7, preferably between 0.6 and 1.6, and advantageously between 0.9 and 1.5.

Preferably, according to the first embodiment of the invention, the ratio of the geometric thickness of the third functional film, to the geometric thickness of the second functional film, counting from the substrate, lies between 0.9 and 1.35, preferably between 1.0 and 1.2, and advantageously between 1.1 and 1.2.

Preferably, according to the first embodiment of the invention, the ratio of the optical thickness of the second transparent dielectric coating, placed between the first and second functional films, to the optical thickness of the first transparent dielectric coating, placed between the substrate and the first functional film, counting from the substrate, lies between 1.6 and 3.8, preferably between 1.8 and 3.5, and advantageously between 2.0 and 3.0.

Advantageously, all these features according to the first embodiment are combined to obtain the best possible result.

Respecting these features according to the first embodiment of the invention makes it easy to obtain stacks that, furthermore, have particularly neutral tints in transmission, with b* values that are <3, preferably <2 and even <1.

Preferably, according to a second embodiment of the invention, the ratio of the optical thickness of the transparent dielectric coating placed between the second and third functional films, to the optical thickness of the transparent dielectric coating placed between the first and second functional films is 1.2 or more, this ratio preferably lying between 1.2 and 1.5, and advantageously between 1.2 and 1.4 and indeed favourably lying between 1.2 and 1.3.

Preferably, according to this second embodiment of the invention, the ratio of the optical thickness of the transparent dielectric coating placed between the second and third, counting from the substrate, functional films, to the optical thickness of the final transparent dielectric coating placed on the last functional film, is 2.2 or more, preferably 2.3 or more, and indeed favourably 2.4 or more. In the case of temperable films, it is advantageous for this ratio to be 2.4 or more and favourably it lies between 2.4 and 2.7, and it is moreover advantageous, in this case, in combination with the latter feature, for the ratio of the optical thickness of the transparent dielectric coating placed between the second and the third functional films, to the optical thickness of the transparent dielectric coating placed between the first and the second functional films, also to be 1.3 or more.

The stacks obtained according to the second embodiment of the invention have a better selectivity. The selectivity will possibly be higher than 2.02 or even 2.05. In addition these stacks combine an excellent appearance with good angular stability and also have the advantage that the tint, observed in reflection on the glass side, is stable during manufacture, this stability, expressed by the Deltacol value, being for example lower than 2.1, even lower than 1.9 and indeed even lower than 1.8.

Preferably, according to the second embodiment of the invention, the geometric thickness of the first, counting from the substrate, functional film lies between 8 and 12 nm, advantageously between 9 and 11 nm, and favourably between 10 and 11 nm.

Preferably, according to the second embodiment of the invention, the geometric thickness of the last, counting from the substrate, functional film lies between 16 and 20 nm, advantageously between 17 and 19 nm, and favourably between 18 and 19 nm.

Preferably, according to the second embodiment of the invention, the optical thickness of the second transparent dielectric coating, placed between the first and second functional films, lies between 105 and 150 nm, advantageously between 115 and 136 nm, and favourably between 119 and 132 nm.

Preferably, according to the second embodiment of the invention, the optical thickness of the third transparent dielectric coating, placed between the second and third functional films, lies between 152 and 175 nm, and advantageously between 156 and 175 nm.

Preferably, according to the second embodiment of the invention, the optical thickness of the final transparent dielectric coating, placed on the last functional film, lies between 58 and 82 nm, and advantageously between 67 and 80 nm.

Preferably, according to the second embodiment of the invention, the ratio of the optical thickness of the first transparent dielectric coating, placed between the substrate and the first, counting from the substrate, functional film, to the optical thickness of the final transparent dielectric coating, placed on the last functional film, lies between 0.5 and 1.2, and advantageously between 0.6 and 1.1.

Preferably, according to the second embodiment of the invention, the ratio of the geometric thickness of the third functional film, to the geometric thickness of the second functional film, counting from the substrate, lies between 1.1 and 1.8, and advantageously between 1.2 and 1.6.

Preferably, according to the second embodiment of the invention, the ratio of the optical thickness of the second transparent dielectric coating, placed between the first and second functional films, to the optical thickness of the first transparent dielectric coating, placed between the substrate and the first functional film, counting from the substrate, lies between 1.5 and 2.6, and advantageously between 1.7 and 2.4.

Preferably, the substrate is an ordinary clear or bulk-tinted soda-lime glass sheet. This is the most suitable substrate to base a solar-control glazing on and it may be subjected to a high-temperature heat treatment such as a tempering or bending heat treatment. Advantageously, the substrate is a sheet of extra-clear glass having a light transmission of higher than 90%, even higher than or equal to 91%, and indeed even higher than or equal to 92%. A particularly preferred substrate is the glass sold under the trade name Clearvision® by AGC Glass Europe.

One embodiment of the invention comprises a transparent substrate bearing a multilayer stack the solar factor of which is very low. A substantial amount of heat-producing radiation is also transmitted in the visible. To reduce transmission of this portion of heat-producing radiation and go beyond removing the energy supplied by infrared radiation, it is necessary to reduce the level of light transmission. In this case, the stack is deliberately made to absorb light in order to reduce light transmission. This absorption is obtained by inserting a film of absorbent material somewhere inside the stack, this material possibly being, for example, formed from an absorbing metal, metal oxide, or oxygen-substoichiometric metal oxide, or from an absorbing metal nitride, nitrogen-substoichiometric metal nitride or metal oxynitride. It is also possible simply to increase the thickness of a metal film protecting one or more of the functional films. The light transmission of a double glazing unit such as described above is then advantageously 57% or less.

It is however necessary to exclude, from this embodiment of the invention, the particular case where there are, in the stack, at least two metallic, in particular titanium-based, films that absorb in the visible, each of these films being placed on and making contact with a functional film, which metallic films result in the light transmission of the resulting double glazing unit, after any optional heat treatment, being less than 50%. In this case, the total thickness of the absorbing metal of these absorbent (in the visible) metallic films placed on the functional films is greater than 1.3 nm as measured in the final product, after any optional heat treatment. This particular case is the subject of the international patent application filed on the 25 May 2011 under the number PCT/EP2011/058540 in the name of the Applicant, and it is not included in the scope of the present invention. Stacks according to the present invention make it possible to obtain all the desired properties described above, without an absorbent metallic film being present in their finished, ready for use, state (i.e. after any optional heat treatment).

Preferably, the light transmission $T_L$ of the stack according to the invention, when it is fitted in a double glazing unit as indicated above, and after any optional heat treatment, is higher than 51%, advantageously higher than 54% and preferably higher than or equal to 57%. The light transmission of a double glazing unit incorporating a stack according to the invention is for example higher than 58%, 59% or 60%. For temperable/bendable stacks, light transmissions higher than 64% and even higher than 66% have been obtained after heat treatment.

The invention relates to a multiple glazing unit comprising at least one substrate bearing a solar-control multilayer stack such as described above.

Preferably, the light transmission $T_L$ of the double glazing unit, such as defined above, is higher than 51%, advantageously higher than 55%, and favourably higher than or equal to 60%.

Preferably, the solar factor of the double glazing unit is 34% or less, preferably 32% or less and advantageously 30.5% or less.

Preferably, the selectivity of the double glazing is higher than 1.95, advantageously higher than or equal to 2, and favourably higher than or equal to 2.05.

The invention also relates to a laminated glazing unit comprising at least one transparent substrate such as described above, assembled with a vitreous material according to the invention by way of an adhesive plastic. Such a glazing unit is advantageously used as a glazing unit in an automotive vehicle, for example as a windscreen.

The invention also relates to a tempered glazing unit bearing an antisolar stack such as described above and having undergone a tempering and/or bending heat treatment at a high temperature above 560° C.

The invention will now be described in greater detail below, but in a non-limiting way, using preferred embodiments.

DESCRIPTION OF EMBODIMENTS

Examples 1 to 13

Examples 1 to 13 were produced in the same way and the structures obtained were similar and even identical (Examples 1 to 10), only the thicknesses changing, as indicated in Table 1.

A 3.2 m by 1 m sheet of 6 mm-thick ordinary clear soda-lime float glass was placed in a low-pressure (about 0.3 Pa) magnetron sputtering coater. A solar-control multilayer stack was deposited on this glass sheet, the multilayer contained the following, in their order.

A first dielectric coating was deposited on the glass sheet. This first coating was formed by two metal-oxide films deposited in a reactive atmosphere consisting of a mixture of argon and oxygen, using metal cathodes. The first metal oxide was a mixed zinc-tin oxide formed using a cathode made of a zinc/tin alloy consisting of 52 wt % zinc and 48 wt % tin in order to form spinel zinc stannate $Zn_2SnO_4$. The second metal oxide was a layer of zinc oxide ZnO having a geometric thickness of about 9.2 nm, deposited using a zinc target. The thickness of the first mixed zinc-tin oxide film was the complement of the thickness of the second ZnO film, so as to achieve the geometric thickness for the first dielectric coating D1 indicated in Table 1 below.

An infrared-reflective functional film IR1 made of silver was then deposited, using a practically pure silver target in an inert atmosphere, for example in argon, on the first dielectric coating D1. The geometric thickness of this film IR1 is given in Table 1.

A 1.4 nm-thick protective film made of sacrificial Ti metal was deposited using a titanium target in an inert atmosphere, directly on the silver film, the sacrificial Ti film having a common interface with the silver film. The oxidizing atmosphere of the plasma used when depositing the following film, described below, oxidizes this sacrificial titanium film. In a stack intended to undergo a tempering, bending and/or toughening heat treatment (the latter being a tempering treatment in which the cooling is less rapid) 2.4 to 3.2 nm of titanium would be deposited under the same conditions. The thickness of the protective film after conversion into an oxide, which was larger than 2.5 nm (value, in oxide, corresponding to the 1.4 nm (geometric thickness) of titanium in the protective film deposited for a non-temperable stack), should be added to the thickness of the following dielectric coating when calculating the ratios according to the invention.

In the same way, the following films were then deposited on the protective film:

a second dielectric coating D2, a second functional film IR2, a 1.4 nm-thick sacrificial Ti film, a third dielectric coating D3, a third functional film IR3, and another 1.4 nm-thick sacrificial Ti film followed by a fourth and last dielectric coating D4.

The second and third infrared-reflective functional films, IR2 and IR3, were formed from silver using a practically pure silver target sputtered in an inert argon atmosphere, in the same way as the film IR1.

The second and third dielectric coatings, respectively D2 and D3, were each respectively formed by three metal-oxide films. The first metal oxide was a zinc oxide obtained using a ceramic cathode made of zinc oxide doped with 2 wt % aluminium and deposited in a slightly oxidizing atmosphere in order to obtain a 20 nm-thick layer of $ZnAlO_x$. The second metal oxide was a mixed zinc-tin oxide formed using a cathode made of a zinc/tin alloy consisting of 52 wt % zinc and 48 wt % tin deposited in a reactive atmosphere consisting of a mixture of argon and oxygen so as to produce spinel zinc stannate $Zn_2SnO_4$. The third metal-oxide film of each of the two coatings D2 and D3 was a 20 nm-thick ZnO film obtained in the same way as the ZnO film of the first dielectric coating described above. The thickness of the mixed zinc-tin oxide film of each of these two coatings D2 and D3 was the complement of the thickness of the first and third metal-oxide films of each of these two coatings, so as to achieve the geometric thickness, for the second and third dielectric coatings D2 and D3, indicated in Table 1 below.

The fourth dielectric coating D4 was formed by two metal-oxide films. The first metal oxide was a zinc oxide obtained using a ceramic cathode made of zinc oxide doped with 2 wt % aluminium and deposited in a slightly oxidizing atmosphere in order to obtain a 13 nm-thick layer of $ZnAlO_x$. The second metal oxide was a mixed zinc-tin oxide deposited in a reactive atmosphere, consisting of a mixture of argon and oxygen, using a cathode made of a zinc/tin alloy consisting of 52 wt % zinc and 48 wt % tin so as to produce spinel zinc stannate $Zn_2SnO_4$. The thickness of this second mixed zinc-tin oxide film was the complement of the thickness of the first $ZnAlO_x$ film so as to achieve the geometric thickness of the fourth dielectric coating D4 indicated in Table 1 below. Optionally, a 2 nm-thick final protective $TiO_2$ film may be deposited on this fourth dielectric coating, the final protective $TiO_2$ film being obtained using a titanium cathode in an oxidizing atmosphere consisting of a mixture of argon and oxygen. In this case, the optical thickness of this thin film must be taken into account when calculating the overall optical thickness of the fourth dielectric coating.

In Table 1, all the thicknesses indicated are geometric (physical) thicknesses. To obtain the optical thickness, all that is required is to multiply the indicated thickness by the refractive index of the material used. The values of the various thickness ratios for the dielectric coatings and functional films discussed above are also given. These ratios were calculated without taking the thickness of the sacrificial protective metal films into account, each of these films being 1.4 nm of Ti.

The coated glass sheet was then assembled, with another clear glass sheet, which was 4 mm thick, into a double glazing unit, the coating being placed on the same side as the internal cavity of the double glazing unit. The cavity separating the two sheets was 15 mm across and 90% of the air contained therein was replaced with argon. The optical and thermal properties indicated in Table 2 were obtained by observing the double glazing unit from the glass side of the coated substrate, the stack being placed in position 2, i.e. the glass side of glass sheet coated with the stack was closest to the observer, then the clear film-free glass sheet. In the present invention, the following conventions were used for the measured or calculated values. The light transmission ($T_L$) and the light reflection ($R_L$) were measured under illuminant D65/2° observer. As regards the tint in reflection, and the tint in transmission, CIELAB 1976 (L*a*b*) values were measured under illuminant D65/10° observer. The solar factor (SF or g) was calculated according to standard EN410.

In Table 2, selectivity (S) and Deltacol (DC) values have also been shown, and values for the variations in a* and b* in reflection, on the substrate side, when the viewing angle changes from 0 to 55°, called respectively "Shift a*" and "Shift b*". "DC ($R_G$)" indicates that the variation index (Deltacol) was obtained in reflection on the substrate side, whereas "DC ($R_F$)" indicates that the variation index (Deltacol) was obtained on the stack side. For the tint values, "$T_L$" indicates that the value was measured in transmission, "$R_F$" indicates that the value was measured in reflection on the stack (film) side, and "$R_G$" indicates that the value was measured in reflection on the substrate (glass) side. The refractive index n(550), at a wavelength of 550 nm, for the dielectric materials zinc stannate, ZnO and $ZnAlO_x$ was 2.03.

It will be noted that the tints in reflection obtained are pleasant and correspond to market demand. The amount of reflection from the substrate side is not too low, thereby avoiding either a "black hole" or mirror effect. The angular variations in tint are small and completely acceptable, and the manufacturing stability is particularly good.

Examples 11-13 are temperable stacks. The thickness of the three films, made of sacrificial metal, protecting the silver films, has been increased to 2.6 nm. In this case, an optional 4 nm-thick final protective TiN film may be deposited, which protective film is converted into $TiO_2$ after heat treatment. If this optional film is used, the optical role of this final protective film is taken into account in the final product by incorporating its optical thickness, calculated as indicated above, into the total thickness of the last dielectric coating. The properties given in Table 2 are the properties of the resulting double glazing unit, the stack having been tempered (heated at 650° C. for 8 mins, followed by abrupt cooling with cold blow air).

As a variant, one of the following sequences of films may be used for D1, D2 and/or D3: $TiO_2$/ZnO:Al or TZO/$TiO_2$/ZnO or $SnO_2$/ZnO/$SnO_2$/ZnO or ZnO:Al/$ZnSnO_4$/ZnO; for D1, one of the following sequences may be used: $Si_3N_4$/ZnO or AlN/ZnO; and for D4, one of the following sequences may be used: ZnO/$SnO_2$ or ZnO/TZO or ZnO:Al/$ZnSnO_4$ or ZnO/$SnO_2$/$Si_3N_4$ or ZnO/$SnO_2$/AlN, optionally with an external protective film. In each case, the geometric thicknesses of the various constituents is suitably chosen, depending on their refractive index, to obtain the optical thickness of the dielectric coating corresponding to the geometric thickness indicated in Table 1 multiplied by the index 2.03. The refractive index n(550), at a wavelength of 550 nm, of the dielectric materials used are the following: for $TiO_2$, n(550)=2.5; for $Si_3N_4$, n(550)=2.04; for $Al_2O_3$, n(550)=1.8; for AlN, n(550)=1.9; and for TZO, n(550)=2.26. The optical thickness must be calculated using the virtual refractive index calculated using the formula given above. The same properties were obtained.

As a variant, the protective films deposited directly on the silver films IR1, IR2 and/or IR3 may be thin (2 nm-thick), optionally aluminium-doped, $TiO_x$ or $ZnO_x$ films deposited, in an atmosphere containing an oxidizing gas or a gas that can generate oxygen such as $CO_2$, using ceramic cathodes respectively made of, optionally doped, titanium or zinc oxide. When the three protective films are formed in this way from $TiO_x$ deposited using a ceramic cathode, the increase in light transmission $T_L$ may be as much as 6 to 8% for a monolithic sheet, relative to a protective film formed by sacrificial Ti metal oxidized by the process used to deposit the following dielectric coating, which process is carried out in an oxidizing atmosphere. When the three protective films are formed in this way from ZnO:Al (2 wt % aluminium) deposited using a ceramic cathode, the increase in light transmission $T_L$ is 3% for a monolithic sheet, relative to a protective film formed by sacrificial Ti metal oxidized by the process used to deposit the following dielectric coating, which process is carried out in an oxidizing atmosphere.

According to yet other variants, it is possible to replace, in the transparent dielectric coating D4, the sequence of metal oxides described above by the sequence ZnO:Al/$TiO_2$ or TZO, by the sequence ZnO:Al/$SnO_2$/$TiO_2$ or TZO, or even by the sequence ZnO:Al/$ZnSnO_4$/TZO.

Comparative Examples 1 and 2

Comparative Examples 1 (C1) and 2 (C2), shown in Tables 1 and 2, relate to stacks not covered by the invention because the combination of ratios of dielectric-coating thickness required by the invention has not been respected. As regards their structure, they were however produced in the same way as the examples according to the invention, Example C1 having the same structure as the non-temperable stacks and Example C2 having the same structure as the temperable stacks. The various thicknesses are given in Table 1, in the same way as for the examples according to the invention.

It will especially be noted that, for Example C1, the selectivity is clearly lower than for the examples according to the invention. The invention allows the selectivity to be optimized while preserving a pleasing appearance and a very good tint stability.

Comparative Example C2 is inspired by the teaching of document EP 645352, mentioned above. A high selectivity is obtained and a pleasing appearance, but at the expense of the stability of the tint during mass production: the value $DC(R_G)$ is more than 20% greater than the values obtained according to the invention.

TABLE 1

| Ex | D1 (Å) | IR1 (Å) | D2 (Å) | IR2 (Å) | D3 (Å) | IR3 (Å) | D4 (Å) | D1/D4 | D3/D2 | D3/D4 | IR3/IR2 | D2/D1 |
|---|---|---|---|---|---|---|---|---|---|---|---|---|
| 1 | 403 | 118 | 791 | 120 | 504 | 125 | 223 | 1.81 | 0.64 | 2.26 | 1.04 | 1.96 |
| 2 | 262 | 114 | 762 | 125 | 556 | 136 | 246 | 1.07 | 0.73 | 2.26 | 1.09 | 2.91 |
| 3 | 298 | 122 | 803 | 128 | 539 | 132 | 252 | 1.18 | 0.67 | 2.14 | 1.03 | 2.69 |
| 4 | 359 | 120 | 773 | 124 | 553 | 139 | 250 | 1.44 | 0.72 | 2.21 | 1.12 | 2.15 |
| 5 | 258 | 112 | 751 | 133 | 637 | 153 | 299 | 0.86 | 0.85 | 2.13 | 1.15 | 2.91 |
| 6 | 339 | 123 | 768 | 136 | 665 | 156 | 310 | 1.09 | 0.87 | 2.15 | 1.15 | 2.27 |
| 7 | 253 | 86 | 599 | 127 | 782 | 191 | 356 | 0.71 | 1.31 | 2.20 | 1.50 | 2.37 |
| 8 | 297 | 91 | 609 | 126 | 794 | 193 | 353 | 0.84 | 1.30 | 2.25 | 1.53 | 2.05 |
| 9 | 365 | 110 | 686 | 139 | 794 | 186 | 374 | 0.98 | 1.16 | 2.12 | 1.34 | 1.88 |
| 10 | 245 | 93 | 580 | 136 | 805 | 177 | 368 | 0.67 | 1.39 | 2.19 | 1.30 | 2.37 |
| 11 | 309 | 106 | 608 | 140 | 799 | 189 | 315 | 0.98 | 1.31 | 2.54 | 1.35 | 1.97 |
| 12 | 295 | 128 | 794 | 137 | 583 | 146 | 235 | 1.26 | 0.73 | 2.48 | 1.07 | 2.69 |
| 13 | 425 | 131 | 782 | 140 | 656 | 162 | 280 | 1.52 | 0.84 | 2.34 | 1.16 | 1.84 |
| C1 | 364 | 104 | 811 | 122 | 528 | 150 | 322 | 1.13 | 0.65 | 1.64 | 1.23 | 2.23 |
| C2 | 300 | 115 | 726 | 142 | 693 | 151 | 296 | 1.01 | 0.95 | 2.34 | 1.06 | 2.42 |

TABLE 2

| Ex | S | g % | $T_L$ % | a* $T_L$ | b* $T_L$ | L* $R_G$ | a* $R_G$ | b* $R_G$ | Shift a* | Shift b* | DC ($R_G$) | DC ($R_F$) |
|---|---|---|---|---|---|---|---|---|---|---|---|---|
| 1 | 1.98 | 29.7 | 58.8 | −6.6 | 0.9 | 43.4 | −0.9 | −5.7 | −0.5 | 3.4 | 1.8 | 2.3 |
| 2 | 1.97 | 29.6 | 58.3 | −6.0 | 0.2 | 44.1 | −3.7 | −5.7 | −0.2 | 4.1 | 1.9 | 2.7 |
| 3 | 1.98 | 29.0 | 57.4 | −5.6 | 1.9 | 46.7 | −4.7 | −8.4 | −1.6 | 4.3 | 1.8 | 2.5 |
| 4 | 2.00 | 29.3 | 58.7 | −6.5 | 0.0 | 43.0 | −2.4 | −4.5 | 0.2 | 3.6 | 2.1 | 2.7 |
| 5 | 2.00 | 30.1 | 60.2 | −6.1 | −0.1 | 41.5 | −3.4 | −4.8 | 0.8 | 4.4 | 1.9 | 2.3 |
| 6 | 2.01 | 30.5 | 61.2 | −5.9 | 0.0 | 40.2 | −3.0 | −3.9 | −1.3 | 4.8 | 1.7 | 2.4 |
| 7 | 2.06 | 29.8 | 61.4 | −6.2 | 2.9 | 40.5 | −2.6 | −6.8 | −0.9 | 2.4 | 1.6 | 5.9 |
| 8 | 2.04 | 29.8 | 60.8 | −5.4 | 3.4 | 41.9 | −4.2 | −7.4 | −1.8 | 2.3 | 1.7 | 5.8 |
| 9 | 2.06 | 30.0 | 61.9 | −5.4 | 1.5 | 40.0 | −3.1 | −4.0 | −3.1 | 3.4 | 1.9 | 3.0 |
| 10 | 2.06 | 29.7 | 61.3 | −5.8 | 3.2 | 41.7 | −1.1 | −5.6 | −2.5 | 2.1 | 2.0 | 4.0 |
| 11 | 2.09 | 32.1 | 67.0 | −4.3 | 4.1 | 45.3 | −3.5 | −6.7 | −2.9 | 3.5 | 1.6 | 2.4 |
| 12 | 2.02 | 32.0 | 64.5 | −4.5 | 3.9 | 48.0 | −4.0 | −6.8 | −0.8 | 5.8 | 2.0 | 2.5 |
| 13 | 2.06 | 32.9 | 67.8 | −4.5 | 2.5 | 43.2 | −3.9 | −3.5 | −0.4 | 6.5 | 2.0 | 2.2 |
| C1 | 1.94 | 29.2 | 56.6 | −6.4 | 1.7 | 49.0 | −2.7 | −4.1 | 0.4 | 3.0 | 1.8 | 1.5 |
| C2 | 2.03 | 34.9 | 70.9 | −4.6 | 2.1 | 38.9 | −1.6 | −3.1 | 1.9 | 3.9 | 2.5 | 0.9 |

The invention claimed is:

1. A transparent substrate comprising a solar-control multilayer stack comprising three functional films based on a material that reflects infrared and four dielectric coatings, wherein
each functional film is sandwiched between dielectric coatings,
a geometric thickness of the second, counting from the substrate, functional film is larger than a geometric thickness of the first functional film and a geometric thickness of the third functional film is larger than the geometric thickness of the first functional film, a ratio of an optical thickness of the transparent dielectric coating placed between the second and third functional films, to an optical thickness of a final transparent dielectric coating placed on a last functional film, is between 2 and 3.2, and the ratio of the optical thickness of the transparent dielectric coating placed between the second and third functional films, to an optical thickness of the transparent dielectric coating placed between the first and second functional films, is between 1.3 and 1.7.

2. The transparent substrate according to claim 1, wherein the ratio of the optical thickness of the transparent dielectric coating placed between the second and third functional films, to the optical thickness of the final transparent dielectric coating placed on the last functional film, is between 2.1 and 3.

3. The transparent substrate according to claim 1, wherein the second functional film is between 12 and 16 nm in thickness, and an optical thickness of the first dielectric coating deposited on the substrate is between 44 and 86 nm.

4. The transparent substrate according to claim 1, wherein the geometric thickness of the first functional film is between 9 and 14 nm.

5. The transparent substrate according to claim 1, wherein the geometric thickness of the last, counting from the substrate, functional film is between 11.5 and 17 nm.

6. The transparent substrate according to claim 1, wherein the optical thickness of the second transparent dielectric coating, placed between the first and second functional films, is between 138 and 170 nm.

7. The transparent substrate according to claim 1, wherein the optical thickness of the third transparent dielectric coating, placed between the second and third functional films, is between 101 and 155 nm.

8. The transparent substrate according to claim 1, wherein the optical thickness of the final transparent dielectric coating, placed on the last functional film, is between 40 and 76 nm.

9. The transparent substrate according to claim 1, wherein the ratio of an optical thickness of the first transparent dielectric coating, placed between the substrate and the first functional film, to the optical thickness of the final transparent dielectric coating, placed on the last functional film, is between 0.5 and 1.7.

10. The transparent substrate according to claim 1, wherein the ratio of the geometric thickness of the third functional film, to the geometric thickness of the second functional film, counting from the substrate, is between 0.9 and 1.35.

11. The transparent substrate according to claim 1, wherein the ratio of the optical thickness of the second transparent dielectric coating, placed between the first and second functional films, to the optical thickness of the first transparent dielectric coating, placed between the substrate and the first functional film, is between 1.6 and 3.8.

12. The transparent substrate according to claim 1, wherein the ratio of the optical thickness of the transparent dielectric coating placed between the second and third functional films, to the optical thickness of the transparent dielectric coating placed between the first and second functional films, is between 1.3 and 1.5.

13. The transparent substrate according to claim 12, wherein the ratio of the optical thickness of the transparent dielectric coating placed between the second and third functional films, to the optical thickness of the final transparent dielectric coating placed on the last functional film, is 2.2 or more.

14. The transparent substrate according to claim 12, wherein the geometric thickness of the first, counting from the substrate, functional film is between 8 and 12 nm.

15. The transparent substrate according to claim 12, wherein the geometric thickness of the last, counting from the substrate, functional film is between 16 and 20 nm.

16. The transparent substrate according to claim 12, wherein the optical thickness of the second transparent dielectric coating, placed between the first and second functional films, is between 105 and 150 nm.

17. The transparent substrate according to claim 12, wherein the optical thickness of the third transparent dielectric coating, placed between the second and third functional films, is between 152 and 175 nm.

18. The transparent substrate according to claim 12, wherein the optical thickness of the final transparent dielectric coating, placed on the last functional film, is between 58 and 82 nm.

19. The transparent substrate according to claim 12, wherein the ratio of the optical thickness of the first transparent dielectric coating, placed between the substrate and the first functional film, to the optical thickness of the final transparent dielectric coating, placed on the last functional film, is between 0.5 and 1.2.

20. The transparent substrate according to claim 12, wherein the ratio of the geometric thickness of the third functional film, to the geometric thickness of the second functional film, is between 1.1 and 1.8.

21. The transparent substrate according to claim 12, wherein the ratio of the optical thickness of the second transparent dielectric coating, placed between the first and second functional films, to an optical thickness of the first transparent dielectric coating, placed between the substrate and the first functional film, is between 1.5 and 2.6.

22. A multiple glazing unit, comprising a transparent substrate according to claim 1.

23. The multiple glazing unit according to claim 22, wherein, when the solar-control multilayer stack is deposited on a 6 mm-thick sheet of ordinary clear soda-lime float glass that is itself associated, by way of a gas-filled cavity, with a 4 mm-thick sheet of ordinary clear soda-lime float glass, a light transmission $T_L$ is greater than 51%.

24. The multiple glazing unit according to claim 22, wherein a solar factor of the unit is 34% or less.

25. The multiple glazing unit according to claim 22, wherein a selectivity of the unit is greater than 1.95.

26. A multiple glazing unit comprising a transparent substrate according to claim 1, wherein the unit is assembled with a sheet of vitreous material via an adhesive plastic.

27. A tempered glazing unit comprising an antisolar stack comprising three functional films based on a material that reflects infrared and four dielectric coatings, wherein each functional film is sandwiched between dielectric coatings, a geometric thickness of the second, counting from a substrate, functional film is larger than a geometric thickness of the first functional film and a geometric thickness of the third functional film is larger than the geometric thickness of the first functional film, a ratio of an optical thickness of the transparent dielectric coating placed between the second and third functional films, to an optical thickness of a final transparent dielectric coating placed on a last functional film, is between 2 and 3.2, and a ratio of the optical thickness of the transparent dielectric coating placed between the second and third functional films, to the optical thickness of the transparent dielectric coating placed between the first and second functional films, is either between 0.6 and 0.9 or between 1.15 and 1.7, the glazing unit having undergone a tempering heat treatment, a bending heat treatment, or both, at a temperature above 560° C., and wherein the substrate bearing the antisolar stack has a Deltacol ($R_G$) value of less than 2.1.

28. The tempered glazing unit according to claim 27, wherein the glazing unit has a selectivity of at least 1.95.

29. A transparent substrate comprising a solar-control multilayer stack comprising three functional films based on a material that reflects infrared and four dielectric coatings, wherein each functional film is sandwiched between dielectric coatings, a geometric thickness of the second functional film, counting from a substrate, is larger than a geometric thickness of the first functional film and a geometric thickness of the third functional film is larger than the geometric thickness of the first functional film, a ratio of an optical thickness of the transparent dielectric coating placed between the second and third functional films, to an optical thickness of a final transparent dielectric coating placed on a last functional film, is between 2 and 3.2, and a ratio of the optical thickness of the transparent dielectric coating placed between the second and third functional films, to an optical thickness of the transparent dielectric coating placed between the first and second functional films, is between 0.6 and 0.85.

30. The transparent substrate according to claim 29, wherein the second functional film is between 12 and 16 nm in thickness, and an optical thickness of the first dielectric coating deposited on the substrate is between 44 and 86 nm.

31. The transparent substrate according to claim 29, wherein the ratio of the optical thickness of the transparent dielectric coating placed between the second and third functional films, to the optical thickness of the final transparent dielectric coating placed on the last functional film, is between 2.1 and 3.

32. The transparent substrate according to claim 29, wherein the geometric thickness of the first functional film is between 9 and 14 nm.

33. The transparent substrate according to claim 29, wherein the geometric thickness of the last, counting from the substrate, functional film is between 11.5 and 17 nm.

34. The transparent substrate according to claim 29, wherein the optical thickness of the second transparent dielectric coating, placed between the first and second functional films, is between 138 and 170 nm.

35. The transparent substrate according to claim 29, wherein the optical thickness of the third transparent dielectric coating, placed between the second and third functional films, is between 101 and 155 nm.

36. The transparent substrate according to claim 29, wherein the optical thickness of the final transparent dielectric coating, placed on the last functional film, is between 40 and 76 nm.

37. The transparent substrate according to claim 29, wherein a ratio of an optical thickness of the first transparent dielectric coating, placed between the substrate and the first functional film, to the optical thickness of the final transparent dielectric coating, placed on the last functional film, is between 0.5 and 1.7.

38. The transparent substrate according to claim 29, wherein the ratio of the geometric thickness of the third functional film, to the geometric thickness of the second functional film, counting from the substrate, is between 0.9 and 1.35.

39. The transparent substrate according to claim 29, wherein the ratio of the optical thickness of the second transparent dielectric coating, placed between the first and second functional films, to the optical thickness of the first transparent dielectric coating, placed between the substrate and the first functional film, is between 1.6 and 3.8.

40. A multiple glazing unit, comprising a transparent substrate according to claim 29.

* * * * *